3,573,243
PROCESS FOR MODIFYING A RUBBER LATEX
Donald Alfred Bennett, Beaulieu, England, assignor to The International Synthetic Rubber Company Limited, Southampton, England
Continuation-in-part of applications Ser. No. 138,260, Sept. 15, 1961, and Ser. No. 412,345, Nov. 19, 1964. This application Oct. 6, 1966, Ser. No. 584,719
Int. Cl. C08d 5/00, 7/12
U.S. Cl. 260—29.7
17 Claims

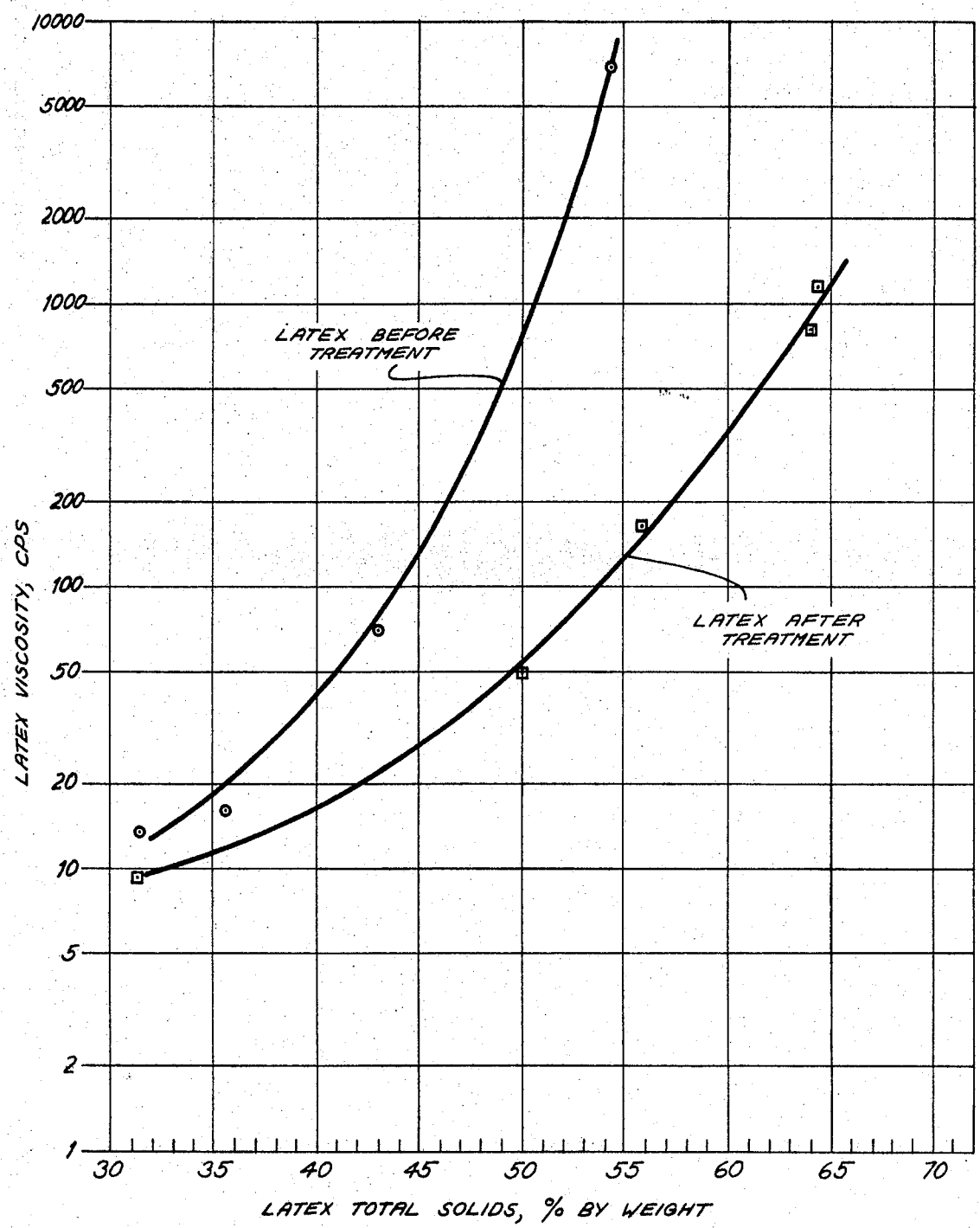

ABSTRACT OF THE DISCLOSURE

The process of reducing the viscosity of a stable rubber latex and increasing the average latex particle size of certain rubber latices, comprising forcing the latex through a constriction at a pressure drop of at least 750 p.s.i. and recovering the latex as a stable emulsion.

---

This invention, which is a continuation-in-part of my earlier co-pending applications Ser. No. 138,260, filed Sept. 15, 1961, and Ser. No. 412,345, filed Nov. 19, 1964, and now both abandoned, is concerned with synthetic rubber latices and, in particular, relates to a method of treating a synthetic rubber latex whereby increased concentration of solids content may be obtained in the latex whilst maintaining a reasonable viscosity. In particular but not essentially, the present invention relates to a method for increasing the particle size of a synthetic rubber latex.

Synthetic rubbers prepared by conventional emulsion polymerisation methods yield latices containing dispersed polymer particles in the size range 300–1000 angstrom units. In addition, the solids content of such latices is generally lower than that required for industrial processes and the latices, therefore, have to be concentrated up to solids content suitable for the user, generally at least 60% solids content. By special polymerisation techniques latices of larger particle size than 1000 angstrom units can be prepared. One such technique involves the use of low emulsifier content polymerisation recipes and considerably extended polymerisation times.

If a synthetic rubber latex consisting of polymer particles in the size range 300–1000 angstrom units is concentrated, its viscosity increases very rapidly at about 40% total solids content, so that concentration much beyond this stage cannot be carried out in conventional equipment, i.e. by evaporation. If the average particle size of the dispersed polymer particles is increased, then concentration may be carried appreciably beyond 40% total solids content before the latex viscosity prevents further concentration.

Methods of increasing synthetic rubber latex particle size are known and reported, the following being examples of methods which have been developed into industrial processes.

The "stockpunkt" process involves adding large amounts of salt together with a stabilising soap to the latex and then cooling the system to between 5° C. and 10° C. at which point a reversible gelation occurs. The clear serum is filtered off and on rewarming the latex returns to a fluid condition and some permanent agglomeration has been found to have taken place.

The "Solvent" agglomeration technique consists of adding substantial amounts of a rubber solvent such as benzene to the latex. This swells the particles, leaving them inadequately covered with soap. It is thought that a condition of crowding occurs and agglomeration results. The chief objection to this process is the high hydrocarbon to water ratios which are required to produce particle sizes adequate for concentration from low solid content latex. The solvent must be removed by distillation and recovered prior to concentration of the latex.

In another process, the "freeze agglomeration" process, the synthetic rubber latex is frozen and rapidly melted. It is found that on melting, the particle size of the latex has increased and a greater proportion of the rubber particle surface area is covered with soap. A disadvantage of this method is that agglomeration to form extremely large particles may also take place, resulting in the production of coagulum.

It is an object of the present invention to provide a simple and economical process for increasing the particle size of a rubber latex without the risks and disadvantages associated with the prior known agglomeration processes.

Another object of the present invention is to provide a method for increasing the average size of the polymer particles of a synthetic rubber latex, and/or reducing the viscosity of such latex, such that the latex may be concentrated to a higher manageable solids content.

It is yet another object of the present invention to provide a method for increasing the average particle size of a synthetic rubber latex, and/or reducing its viscosity without causing formation of significant quantities of coagulum.

According to the present invention a synthetic rubber latex is modified by subjecting it to turbulent flow through a constriction at a pressure drop of not less than about 750 p.s.i.

More particularly, according to one embodiment of the present invention, a synthetic rubber latex is treated to form a modified latex substantially free of coagulum, by flowing a latex having a concentration of dispersed polymer particles, i.e. solids content, of not less than 15% by weight, through a constriction, the pressure drop across said constriction being not less than about 1000 p.s.i., so as to form a stable modified latex capable of being evaporated to a solid content which is relatively higher at a given viscosity than that of a comparable unmodified latex.

Another embodiment of the present invention comprises flowing a synthetic rubber latex at certain conditions of pH and temperature through a constriction, the pressure drop across said constriction being not less than 750 p.s.i., and said latex having a concentration of dispersed polymer particles of not less than 30% by weight.

In either of the above-mentioned embodiments, the average size of polymer particles in the modified latex is increased or its viscosity is reduced, or both. It is generally recognised in the rubber latex art that an increase in latex particle size is accompanied by a decrease in viscosity. When the process of the present invention is performed on a rubber latex having an average particle diameter between about 300 and 1000 angstroms, there is generally obtained both an increase in average particle size and a decrease in latex viscosity. When the process is performed on latices having an initial polymer particle diameter much in excess of 1000 angstroms, there may be little or no increase in average particle diameter, however there is still exhibited a corresponding decrease in latex viscosity. When the average particle size is increased, the actual agglomeration may involve less than all of the particles. The total effect, however, is an increase in average size. Even in those instances wherein no increase in average particle size is noted, there is an apparent rearrangement of the particle sizes that is reflected in the decreased viscosity.

These effects, and the totally unexpected discovery that the modification is obtained without de-stabilising the latex, i.e. without formation of significant quantities of coagulum, have important ramifications concerning the preparation of stable high-solids content latex.

When a latex is concentrated to increase the solids content there is an inherent increase in viscosity. It will be appreciated therefore, that by reducing the viscosity in accordance with the present invention, the treated latex may be concentrated to a solids content higher than that of the latex prior to treatment without increasing the viscosity beyond the original value or beyond a desirable level. In the past a latex could be obtained from a polymerisation process which latex initially had a viscosity below a maximum acceptable level and a comparatively low solids content. Such a latex could in accordance with known practice be concentrated only until the viscosity had reached the maximum acceptable value, namely not substantially higher than about 2000 centipoises (Brookfield viscometer method), although the solids content would still be considered to be undesirably low. Further concentration was of no avail because of the undesirable increase in viscosity above the maximum acceptable value. The present invention permits such a latex to be treated to reduce its initial viscosity whereby after concentration the latex has a much increased solids content without the viscosity going above the maximum acceptable level.

When the method of the present invention modifies the latex so as to form an increased average particle size, the latex may be used directly in a number of applications where increased solids content is not essential but a specific particle size is desirable, e.g. in the impregnation or sizing of paper.

The high pressure turbulent flow imparted to the latex according to the invention may be provided by any convenient constriction through which the appropriate pressure drop can take place.

Conventional equipment for homogenising (i.e. producing homogeneous mixtures or dispersions) liquids is a preferred means for performing the method according to the present invention, said equipment consisting essentially of a high pressure pump which forces the latex to be treated through an orifice or homogenising valve, at an elevated pressure. Other suitable constrictions, such as a partially cracked gate valve, are also useful.

The pressure to which the latex is pumped before passing through the orifice or homogenising valve may be up to 10,000 p.s.ig., or even higher, but preferably not below 1000 p.s.i.g. for latices having not less than 15% solids, and preferably not below about 750 p.s.i.g. for latices having not less than 30% solids. Generally speaking, the increase in particle size produced is greater at higher pumping pressures.

The latices to which this method may be applied may be copolymer latices of a conjugated diolefin together with an aryl olefin or acrylonitrile, or they may be homopolymer latices of a conjugated diolefin or polychloroprene. Mixtures of such synthetic rubber latices may be used, as may blends of synthetic and natural rubber latex or natural rubber latex alone, as described more fully in co-pending application Ser. No. 293,274, filed July 8, 1963, by the present inventor and another, and now abandoned.

The method is particularly suited to latices containing copolymer of 1,3 butadiene and styrene prepared by conventional emulsion polymerisation techniques. The synthetic rubber forming monomers may be copolymerised to yield copolymer containing at least 20–30% bound styrene. They may be emulsified in water prior to or during the copolymerisation process, using conventional emulsifying agents such as 2 to 5 parts per 100 parts of monomers of water soluble fatty acid soaps, e.g. potassium or sodium oleate or rosin acid soaps, e.g. potassium or sodium rosinate or mixtures of fatty acid and resin acid soaps. Temperature of copolymerisation may be between 0 and 70° C. and conventional Redox systems may be used to promote copolymerisation, e.g. oxidising agents such as organic peroxides (cumene hydroperoxide, di-isopropyl benzene hydroperoxide) or alkali metal persulphates (potassium persulphate) mixed with reducing agents such as heavy metal salts, e.g. ferrous sulphate. Reaction between the monomers may be stopped when 50 to 90% of the total monomer charge has reacted by the addition of a conventional shortstopping agent, e.g. 0.05–0.5 part of sodium dimethyl dithiocarbamate per 100 parts of monomers charged to the polymerisation system, or reaction may be taken substantially to completion.

The unreacted monomers may be removed and recovered from the resulting copolymer latex by conventional means, such as heating under reduced pressure followed by vacuum steam stripping.

The resultant latex may contain synthetic rubber particles in the size range 300–1000 angstrom units, and having 20 to 70% of the total particle surface area covered by the soap used for emulsifying the original monomers. It may contain as little as 15% total solids.

The pH of the latex to be treated may be adjusted by conventional methods, e.g. addition of carbon dioxide, sodium silico fluoride, glycine, and the increase in average particle size obtained by the present method is greater as the pH is lowered. If the pH is taken too low, however, some undesirable coagulation of the polymer particles in the latex takes place. The preferred pH of the latex to be treated is in the range 7.00–11.0 but may be as high as 13.

As previously mentioned, synthetic rubber latices having particles in the size range 300–1000 angstrom units may be partially concentrated by conventional methods, e.g. evaporation to at least 40% total solids content. In the present method the increase in latex particle size obtained is greater as the total solids content of the original latex is raised. The preferred total solids content of the synthetic rubber latex to be treated is 35 to 50% but increase in particle size can be achieved by the present method with initial latex concentrations as low as 15%.

The temperature of the latex treated has an effect on the increase in particle size obtained by the present method, the increase obtained being greater as the initial latex temperature is reduced, the preferred temperature being in the range 0 to 50° C., but some increase in particle size does take place at temperatures up to 80° C. or even higher. When treating small particle size latex, by correct adjustment of latex pumping pressure, pH value, total solids content, and temperature, a synthetic rubber latex containing particles of size considerably greater than those in the original latex can be produced, when the latex is pumped through a constriction such as an orifice or homogenising valve. Such a large particle size latex can be concentrated by conventional means, e.g. evaporation, to yield a final product of at least 60% total solids content, without excessive viscosity being encountered.

The following are typical experimental results obtained. The parts of ingredients referred to are per 100 parts of original combined monomers charged to the polymerisation equipment. In the following examples coagulum is defined as the percentage by weight of solid synthetic rubber retained on a B.S.S. 85 mesh screen, washed free of latex and dried, when the synthetic rubber latex is passed through the screen. Determinations of particle soap coverage and particle size are made using the so-called "soap titration" method. On adding small increments of soap to latex, the particles of which are not fully covered with soap, there is a sharp change in the surface tension of the latex at the point where the particles become fully covered. From this data, knowing the soap originally present per gram of polymer and the effective molecular surface area of the titrating soap used, the total surface area of the particles and hence an average particle diameter can be calculated.

The latex used in the following examples was prepared by copolymerisation at 5° C. of 1,3 butadiene and styrene in an aqueous emulsion containing 150 parts of water, 2.34 parts oleic acid, and 0.43 part potassium hydroxide. The ratio of the two monomers charged was 70 parts butadiene: 30 parts styrene. A conventional "redox" activating system was used. When approximately 68% of the originally charged combined monomers had reacted, the copolymerisation was terminated by the addition of 0.095 part of sodium dimethyl dithiocarbamate. The unreacted monomers were removed and recovered by the usual combination of flash vapourisation and vacuum steam stripping.

EXAMPLE I

The latex, prepared as described above, was concentrated by evaporation in conventional equipment to 46% solids content. Soap coverage and particle size, determined by the "soap titration" method, were 41% and 670 angstrom units respectively. The latex pH was adjusted to 8.75 and the latex was pumped at 4500 p.s.i.g. through the orifice of homogenising equipment at two different temperatures. The following results were obtained:

| Initial latex temp., ° C. | Soap coverage, percent | Particle size, A. | Coagulum, percent |
|---|---|---|---|
| 40 | 75 | 1,218 | 0.02 |
| 24 | 111 | 1,804 | 0.05 |

These results show that the effect of increase in particle size is greater as the latex temperature is reduced. They also show that treating a latex dispersion in this violent manner surprisingly does not de-stabilize the suspension so as to create coagulum.

EXAMPLE II

The same partially concentrated (46% total solids) latex as was used in Example 1 was pumped through the homogenising equipment at a pH of 8.00 and a pressure of 4500 p.s.i.g., when the following results were obtained:

| Initial latex temp., ° C. | Soap coverage, percent | Particle size, A. | Coagulum, percent |
|---|---|---|---|
| 40 | 85 | 1,382 | 0.03 |
| 26 | 134 | 2,200 | 0.13 |

These results confirm the temperature effect shown in Example I, whilst comparison of the results in Examples I and II also shows the improvement in particle size increase obtained by reduction of initial latex pH.

EXAMPLE III

A further example of the improvement in particle size increase as pH is reduced is illustrated by the following data obtained in a test in which an emulsion polymerised styrene butadiene synthetic rubber latex was treated in homogenising equipment at 8000 p.s.i.g. ambient temperature and 42% solids content at varying pH's. The initial soap coverage and particle size were 44.1% and 726 angstrom units respectively.

| Initial pH | Soap coverage, percent | Average particle size, angstrom units |
|---|---|---|
| 10.0 | 108.4 | 1,783 |
| 11.0 | 99.8 | 1,642 |
| 12.0 | 84.1 | 1,267 |
| 13.0 | 52.3 | 787 |

EXAMPLE IV

Further samples of latex prepared as described above were concentrated to 44% total solids content, and passed through the homogenising equipment at a temperature of 12° C. and at different pressures. The soap coverage and particle size after initial concentration to 44% total solids content were 41% and 663 angstrom units respectively.

| Pump pressure, p.s.i.g. | Initial latex pH | Soap coverage, percent | Particle size, A. | Coagulum, percent |
|---|---|---|---|---|
| 2,000 | 9.5 | 93 | 1,506 | 0.04 |
| 3,000 | 9.5 | 107 | 1,743 | 0.04 |
| 5,000 | 9.5 | 131 | 2,136 | 0.02 |

These results show the improvement obtained in particle size increase as pumping pressure is increased.

EXAMPLE V

A further sample of latex concentrated to 43% total solids content was diluted to varying concentrations, and the diluted samples passed through the homogenising equipment at a pH of 8.0, and pressure of 4500 p.s.i.g.

| Total solids content, percent | Soap coverage | Particle size, A. | Coagulum, percent |
|---|---|---|---|
| 18.5 | 44.4 | 775 | Nil. |
| 25.0 | 70.0 | 1,230 | Nil. |
| 30.0 | 75.7 | 1,320 | Nil. |
| 36.0 | 97.0 | 1,685 | Nil. |
| 42.0 | 99.0 | 1,730 | Nil. |

This set of results shows that the increase in particle size obtained on pumping latex through homogenising equipment is greater if the total solids content of the original latex is increased.

It will be appreciated that increase in particle size of synthetic rubber latices may be obtained by the present method using other combinations of temperature, initial pH, initial solids content, and pumping pressure within the ranges hereinbefore described.

Although the increase in particle size as shown in the foregoing examples does results in a corresponding and correlative reduction in viscosity, the pressure treatment, according to the present invention, of a synthetic rubber latex may also be employed to obtain an improved solids/viscosity relationship without necessarily increasing average polymer particle size. In accordance with this aspect of the invention an already high solids content latex can be treated to produce an improved latex, the improvement residing in the fact that the latex viscosity is reduced and, if desired, the treated latex can be further concentrated without producing a highly viscous latex which is undesirable.

Examples of the treatment of high solids content latices are as follows:

EXAMPLE VI

Original latex:

Soap coverage—118.4%
Average particle size—1920 angstrom units
Total solids content—64.6%
Viscosity—2000 centipoises.

After passing the latex through homogenising equipment at 8000 p.s.i.g., pH 10 and ambient temperature, it was found that the soap coverage was 102.2%, that the average paticle size was 1789 angstrom units and that the latex viscosity had decreased to 200 centipoises. The treated latex was then concentrated in known manner, to 71.2% total solids content before the original viscosity of 2000 centipoises was reached.

EXAMPLE VII

A further sample of latex having the following properties:

Soap coverage—103%
Average particle size—1703 angstrom units
Total solids content—63.3%
Viscosity—280 centipoises was passed through homogenising equipment at 8000 p.s.i.g., 8.28 pH and ambient temperature. The treated latex was found to have the following properties:

Soap coverage—103%
Average particle size—1703 angstrom units
Total solids content—63.3%
Viscosity—125 centipoises.

As may be seen from the foregoing examples and the following example, the ease and amount of agglomeration or reduction in viscosity of the modified latex is effected by the selection of parameters such as pH, temperature, concentration, pressure drop and soap to rubber ratio.

It has also been found, as described in my co-pending application Ser. No. 412,345, filed Nov. 19, 1964, and now abandoned, that careful selection of the parameters will permit effective results even at pressure drops as low as 750 p.s.i.g. For operation of the process of the present invention at the lower pressure drops, and more particularly between about 750 p.s.i.g. and 1000 p.s.i.g., the solids content of the untreated latex should not be substantially less than 30% by weight for optimum results. Moreover, the pH should be maintained between about 7 and 9. The temperature is preferably kept at between about 0° C. and 25° C., and the soap to rubber ratio at between about 3.5 and 4.5.

The following example illustrates this aspect of the invention.

EXAMPLE VIII

The latex used was prepared by copolymerisation at 5° C. of 1,3 butadiene and styrene (in a ratio of 70:30) in an aqueous emulsion containing 120 parts of water; 3.0 parts of potassium oleate. A conventional "redox" system was used, and copolymerisation was terminated by the addition of 0.095 part of sodium dimethyl dithiocarbamate when approximately 75% of the originally charged monomers had reacted. The unreacted monomers were removed and recovered by the usual combination of flash vaporisation and steam stripping.

The latex thus obtained was concentrated in a conventional full plant scale evaporator to 48% total solids content, the initial soap coverage being 46.3%, corresponding to an average particle diameter of 800 angstrom units.

The pH of the latex was adjusted to 8.3 and it was then passed through a three cylinder homogeniser at a temperature of 3° C. at various pressures with the following results:

| Homogeniser pressure, p.s.i.g. | Soap coverage, percent | Average particle size, A. |
|---|---|---|
| 750 | 70 | 1,030 |
| 1,000 | 112 | 1,650 |

The latex modified at 750 p.s.i.g. was unstable and readily coagulated if disturbed. It was stabilised by the addition of dilute potassium oleate solution and this additional amount of soap added was taken into consideration in the determination of soap coverage and particle size.

The sample treated at 750 p.s.i.g. and stabilised with additional potassium oleate soap solution was readily evaporated by conventional means and yielded a stable product containing 68.8% total solids and having a viscosity of 1850 cps.

At homogenising pressures as low as 500 p.s.i.g. there is some small improvement, but the instability of the latex at these very low pressures when taken together with the substantially reduced size increase mitigates against such conditions.

As referred to above, one of the outstanding attributes of the present invention is that it permits the production of a stable rubber latex of reduced viscosity and/or increased particle size which may be concentrated, as by evaporation, to form a latex having a reasonable and manageable viscosity with a solids content that far exceeds that of the comparable unmodified latex evaporated to the same viscosity.

This viscosity/solids relationship is shown more particularly in Example IX below.

EXAMPLE IX

A further sample of emulsion polymerised butadiene/styrene latex, prepared as described previously, and partially evaporated to 31.5% by weight total solids content, was divided into two portions.

One portion was further evaporated without treatment according to the present invention, whilst the other portion was treated in accordance with the present invention by being passed through a homogeniser at 5,000 p.s.i.g. pressure, its pH having been adjusted to 7.4. This treated latex was then further evaporated.

The solids/viscosity and other properties of the two samples are shown below:

| | Latex before treatment | | Latex after treatment | |
|---|---|---|---|---|
| | Total solids, percent by weight | Viscosity, cps. | Total solids, percent by weight | Viscosity, cps. |
| | 31.5 | 13.5 | 31.6 | 9.5 |
| | 35.7 | 16.0 | 50.0 | 50.0 |
| | 43.0 | 70.0 | 56.0 | 160 |
| | 54.0 | 7,000 | 64.0 | 820 |
| | | | 64.6 | 1,120 |
| Coagulum content, percent by weight | 0.01 | | 0.02 | |
| Particle size, angstrom units | 546 | | 1637 | |
| Soap coverage, percent | 37.0 | | 111.0 | |

It will be seen that, whereas the viscosity of the untreated latex rose sharply on evaporation to a very high and unmanageable value at about 54% solids content, the treated sample was capable of being evaporated to a much higher and acceptable solids content whilst its viscosity remained well below a limiting value for reasonable and practical handling characteristics.

The improvement in the latex had been effected substantially without production of coagulum, and was attended by an increase in soap coverage and in average particle size.

It will also be noted that numerically, the viscosity improvement at low solids content is quite small (13.5 to 9.5 cps. at 31.5% solids). However, the profound effect on viscosity improvement is readily seen as evaporation proceeds to higher solids contents.

The solids/viscosity characteristics of the treated and untreated samples are shown graphically in FIG. 1.

Typical operating conditions which have been found vary satisfactory for butadiene styrene latex are: a solids content of between about 35% and 45% by weight, a pH of between about 8 and 10, a temperature of between about 10° C. and 30° C., and a pressure drop of between about 2500 p.s.i. and 5000 p.s.i. When using these conditions it is possible to obtain, with subsequent evaporation, a latex of solids content 68.5% by weight and a viscosity no higher than 750 c.p.s. Brookfield.

The numerical values of viscosity, expressed in centipoises, referred to hereinbefore were determined according to standard procedure using a Brookfield viscometer with a No. 3 spindle rotated at 20 r.p.m.

What I claim is:

1. A method of treating a synthetic rubber latex to form a stable latex capable of evaporation to a solids content at a given viscosity which solids content is relatively higher than that of the untreated latex evaporated to the same viscosity, comprising flowing a synthetic rubber latex having a solids content of not less than about 15% by weight and selected from the group consisting of a copolymer of a conjugated diolefin together with an aryl olefin, a copolymer of a conjugated diolefin together with acrylonitrile, a homopolymer of a conjugated diolefin, and polychloroprene, under pressure through a constriction, the pressure drop across said constriction being not less than about 1000 p.s.i., and recovering the latex as a stable substantially coagulum-free latex.

2. A method according to claim 1, wherein the particles of synthetic rubber in the latex have an initial average diameter of between about 300 and 1000 angstrom units.

3. A method according to claim 1, wherein the pH of the latex to be treated is in the range 7 to 13.

4. A method according to claim 3, wherein the latex is passed through the constriction at a pH in the range 7 to 11.

5. A method according to claim 1, wherein the latex is passed through the constriction at a temperature in the range 0–80° C.

6. A method according to claim 5, wherein the latex is passed through the constriction at a temperature in the range 0–50° C.

7. A method according to claim 1, wherein the solids content of the latex to be treated is in the range 35–50% by weight.

8. The method of increasing the average latex particle size of a rubber latex comprising flowing a latex comprising a copolymer of a major proportion of butadiene and a minor proportion of styrene through a homogenising valve at a pressure of between about 1000 p.s.i.g. and 10,000 p.s.i.g., the particle of said copolymer latex having an initial average diameter between about 300 and 1000 angstrom units and said copolymer latex being maintained at a temperature of between about 0 and 80° C. and at a pH of between about 7 and 13 and having a solids content not less than about 15% by weight of rubber.

9. The method according to claim 8, wherein said pH is between about 7 and 11, said temperature is between about 0 and 50° C., and said solids content is between about 35% and 50% by weight.

10. The method of treating a synthetic rubber latex selected from the group consisting of a copolymer of a conjugated diolefin together with an aryl olefin, a copolymer of a conjugated diolefin together with acrylonitrile, a homopolymer of a conjugated diolefin, and polychloroprene, to form a modified latex substantially free of coagulum, comprising flowing said synthetic rubber latex while at a temperature in the range 0° C. to 25° C. under pressure through a constriction, the pressure drop across said constriction being not less than about 750 p.s.i., said latex having a pH in the range of between about 7 and 9 and a solids content not less than about 30% by weight of rubber, whereby the modified latex is made capable of evaporation to a solids content at a given viscosity which solids content is relatively higher than that of the unmodified latex evaporated to the same viscosity.

11. The method according to claim 10, wherein the soap to rubber ratio of the latex to be treated is in the range of between about 3.5 and 4.5.

12. The method of treating a rubber latex selected from the group consisting of a copolymer of a conjugated diolefin together with an aryl olefin, a copolymer of a conjugated diolefin together with acrylonitrile, a homopolymer of a conjugated diolefin, and polychloroprene, to form a modified latex of reduced viscosity and substantially free of coagulum comprising flowing said rubber latex having a solids content of not less than about 15% by weight of rubber under pressure through a constriction, the pressure drop across said constriction being between about 1000 p.s.i. and 10,000 p.s.i. said latex under pressure being at a temperature of between 0° C. and 80° C. and having a pH of between about 7 and 13, whereby the modified latex is made capable of evaporation to a solids content at a given viscosity which solids content is relatively higher than that of the unmodified latex evaporated to the same viscosity.

13. The method according to claim 2, wherein said synthetic rubber latex is a dispersion of a copolymer of butadiene and styrene having a solids content of between about 35% and 45% by weight, an average latex particle diameter of between about 300 and 1000 angstrom units, a pH of between about 8 and 10 and a temperature of between about 10° C. and 30° C., and wherein said constriction is a homogenising valve, and the pressure drop across said homogenising valve is between about 2500 and 5000 p.s.i.

14. The process according to claim 1 wherein the modified latex is subsequently evaporated to a higher solids content.

15. The method according to claim 8 wherein the modified latex is subsequently evaporated to a solids content of not less than 60% total solids.

16. The method according to claim 15 wherein the evaporation of the latex is terminated before the latex reaches a viscosity of about 2000 centipoises (by the Brookfield viscometer method).

17. The method according to claim 10 wherein the modified latex is characterized by an average particle diameter about at least 28% larger than that of the unmodified latex.

References Cited
FOREIGN PATENTS
588,672  12/1959  Canada _____ 260—746

MURRAY TILLMAN, Primary Examiner
W. J. BRIGGS, Sr., Assistant Examiner

U.S. Cl. X.R.
260—5, 85.1